Nov. 16, 1971   G. BIXBY, JR   3,620,155
COFFEE BREWING APPARATUS
Filed April 22, 1970   3 Sheets-Sheet 1
FIG. 1
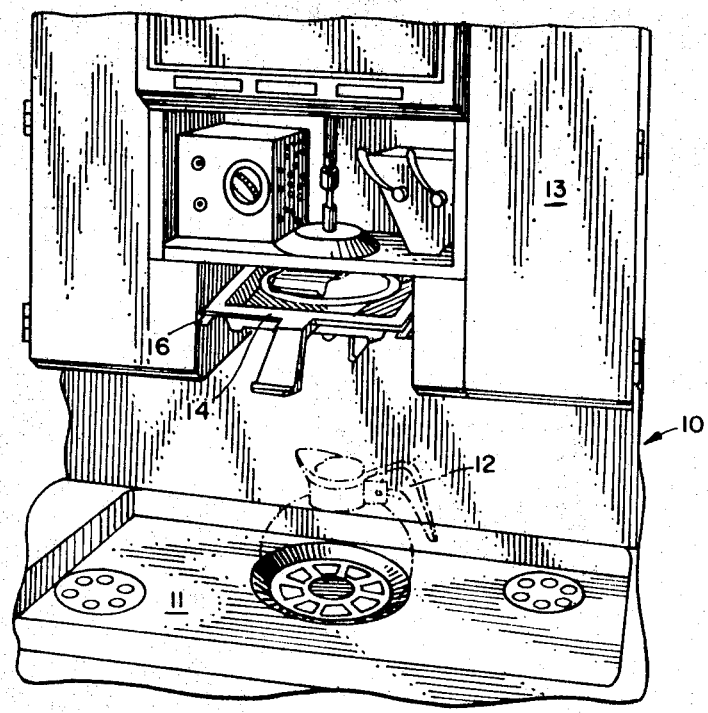
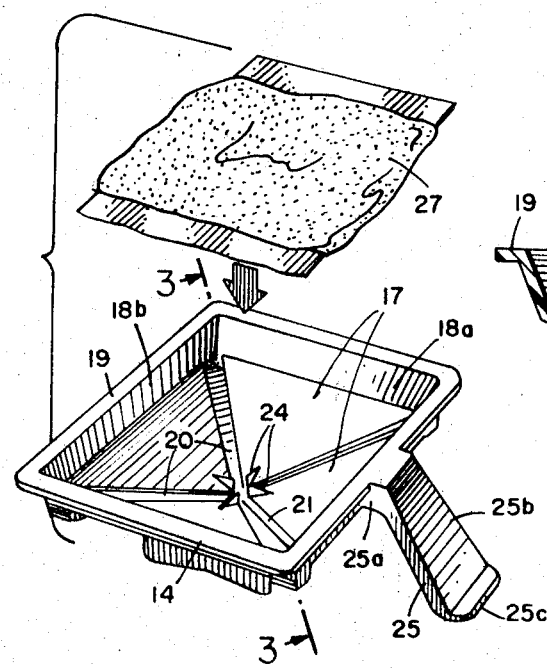
FIG. 2
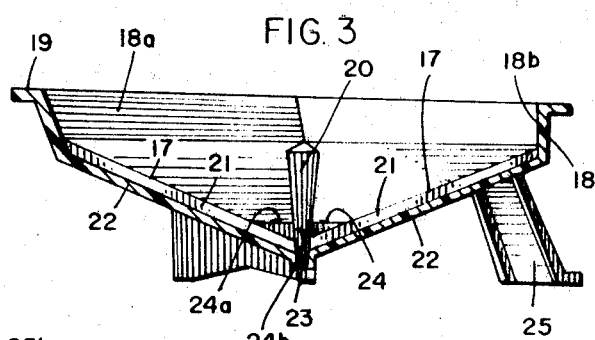
FIG. 3
INVENTOR:
GEORGE BIXBY, JR.
BY
Dawson, Tilton, Fallon & Lungmus
ATT'YS Nov. 16, 1971  G. BIXBY, JR  3,620,155
COFFEE BREWING APPARATUS
Filed April 22, 1970  3 Sheets-Sheet 2

INVENTOR.
GEORGE BIXBY, JR
BY
Dawson, Tilton, Fallon & Lungmus
ATT'YS

Nov. 16, 1971  G. BIXBY, JR  3,620,155

COFFEE BREWING APPARATUS

Filed April 22, 1970  3 Sheets-Sheet 3

INVENTOR
GEORGE BIXBY, JR.
BY
Dawson, Tilton, Fallon, Lungmus
ATT'YS

United States Patent Office 3,620,155
Patented Nov. 16, 1971

3,620,155
COFFEE BREWING APPARATUS
George Bixby, Jr., Scottsdale, Ariz., assignor to Automatic Marketing Industries, Inc., Phoenix, Ariz.
Continuation-in-part of application Ser. No. 771,136, Oct. 28, 1968, now Patent No. 3,511,166. This application Apr. 22, 1970, Ser. No. 30,877
Int. Cl. A47j 31/14
U.S. Cl. 99—295      7 Claims

ABSTRACT OF THE DISCLOSURE

Coffee brewing apparatus using a filter bag wherein a movable pressure plate confines the bag within an open-topped tray to insure thorough distribution of hot water through the grounds in the filter bag.

RELATED APPLICATION

This application is a continuation-in-part of my prior co-pending application entitled "Coffee Brewing Apparatus," Ser. No. 771,136, filed Oct. 28, 1968, now Patent No. 3,511,166.

BACKGROUND AND SUMMARY OF INVENTION

This invention is an improvement on co-owned patent 3,320,073. In that patent, heated water was caused to flow by gravity through coffee in a pre-packaged wet strength paper-like bag. In certain instances it has been found more desirable to use a smaller bag with the water flowing therethrough by pressure. Such pressure systems have long been known for air lines usage but require brewers that are too complicated for restaurant and office use.

In contrast to this, I employ a pressure system utilizing merely the pressure from the metropolitan mains so that no complicated pressure tanks, etc. are needed. Further, I make use of the heretofore waster gas that is expelled during brewing. In previous systems, trapped air and released gas inflated the coffee bags which resulted in short circuiting of the brewing water. This previously-endured drawback is employed in the invention to create a fluid seal with a movable presser plate mounted above the bag, the bag itself being confied in a tray having downwardly convergent flat bottom walls. I also provide unique bag expansion freedom means through the movement of the presser plate during the brewing cycle.

In my said co-pending application Ser. No. 771,136, now patent No. 3,511,166, the bag was confined in a flat bottomed foraminous tray which was supported by a pan. I have now found that a single pan or tray can be used to support the coffee bag. The pan includes four sloping bottom walls which coverage to provide a central opening, and a drain channel is provided at each intersection between adjacent sloping walls. The center of the bag is supported by raised embossments in the sloping walls which raise the bag away from the opening and prevent clogging thereof.

The invention here is particularly suited for restaurant usage and for that purpose two different types of water sources are provided. It will be appreciated that in some instances space considerations dictate a rather short tank and one embodiment of the invention is responsive to this need. In either event, however, the apparatus providing the source of brewing water is effective in conjunction with the brewer itself in substantially minimizing "drip-out." By drip-out, I refer to liquid draining from the brewer after the main body of liquid has passed through the brewer. It wll be quickly appreciated that this is objectionable for a number of reasons—messiness, wastefulness, etc.

The invention is described in conjunction with the accompanying drawing, in which:

FIG. 1 is a fragmentary perspective view of apparatus embodying teachings of the invention;

FIG. 2 is an exploded perspective view of the brewer portion of the apparatus of FIG. 1;

FIG. 3 is a cross sectional view of the bag holding tray taken along the line 3—3 of FIG. 2;

Figure 7:
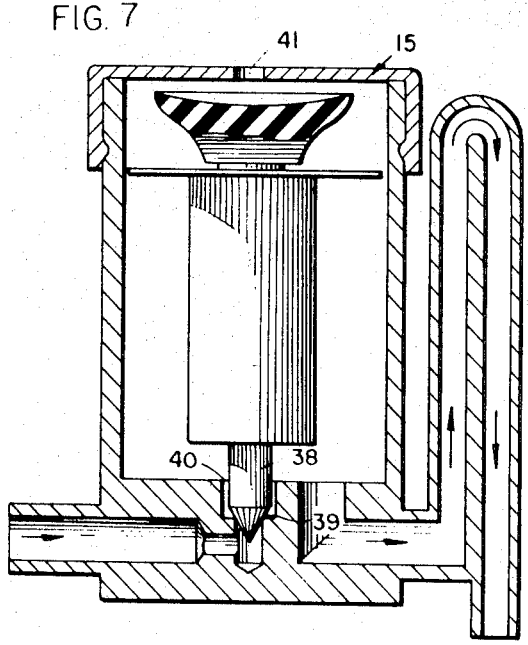
Figure 8:
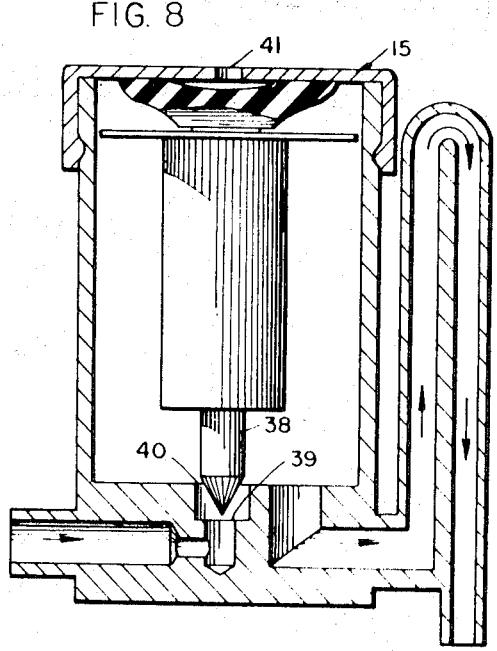
Figure 9:
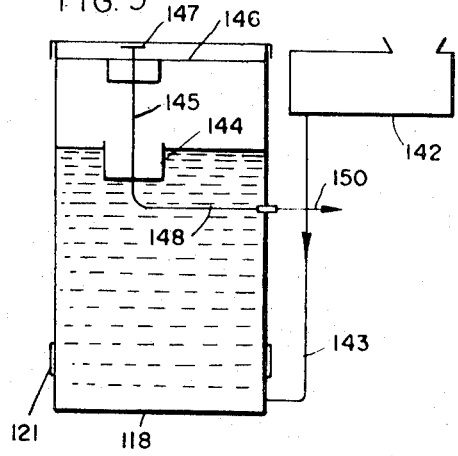
Figure 10:
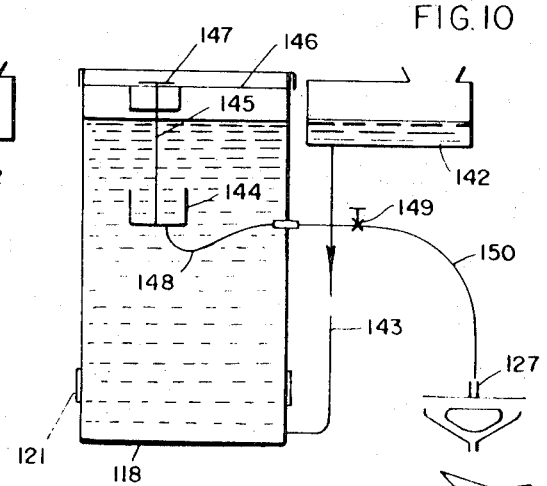

FIGS. 7 and 8 are enlarged elevational views, partially in section, of a check expansion chamber, the showings in FIGS. 7 and 8 being in different stages of operation; and FIGS. 9 and 10 are schematic representations of a modified form of water source, again the two views showing different conditons of the operation of the device.

In the illustration given and with reference to FIG. 1, the numeral 10 designates generally a chassis having a platform 11 for supporting a carafe 12. The chassis 10 provides a housing 13 above the carafe 12 which contains the various elements which cooperate to provide brewed, liquid coffee. An important combination of these elements is seen in the central portion and constitutes the brewer generally designated 14.

As explained in my said co-pending application water for the brewing may be supplied through a conduit or metropolitan main which passes through a solenoid valve and a flow control valve, and then through a serpentine heat exchanger coil positioned in a water tank. As the water passes through the serpentine coil, it picks up heat from the water in the tank, the tank water having been heated by virtue of a suitable heater. From there, the water passes through a check expansion chamber 15 (FIGS. 7 and 8) and then to the brewer 14.

The brewer unit 14 is removably supported on side rails 16 (see FIGS. 1 and 4) which are provided as part of the housing 13. The brewer consists of a pan or tray having four sloping or downwardly convergent bottom walls 17 and a perimetric side wall 18 which extends generally upwardly from the bottom walls at a much smaller angle from the vertical. A side flange 19 extends generally vertically outwardly from the side wall and cooperates with the side rails 16 to support the tray. Opposing side wall portions 18a are seen to extend at a slight angle from the vertical, while the other opposing side wall portions 18b extend generally vertically upwardly from their associated bottom walls.

A channel or groove 20 is provided at the intersection of each pair of adjacent bottom walls, each channel including generally vertical side wall portions 21 and a bottom or web portion 22 which is inclined at about the same angle as the bottom wall but is positioned about ¼″ below the bottom wall. The four channels 20 converge at the center of the tray, and a discharge opening 23 is provided through the tray where the channels meet.

Each of the bottom walls is seen to be generally triangularly shaped, and a raised embossment or wing 24 extends upwardly from the lowermost point of each of the triangular walls. The embossments are also generally triangularly shaped, and each includes a flat, generally horizontal bag-supporting surface 24a and a generally vertical side 24b. The embossments do not extend into the drain channels 20 and do not interfere with the flow of water and brewed coffee therein.

A handle 25 extends outwardly from side wall portion 19d and includes an attaching portion 25a which extends generally parallel to the flange 19, a gripping portion 25b which angles downwardly, and a base portion 25c which extends parallel to the attaching portion. A pair of supporting legs 26 extend downwardly from each leg extending below the discharge opening 23 to a point approximately level with, or slightly below, the base 25c of the handle. The supporting legs permit the tray to stand upright on a level surface, and the base of the handle will prevent tipping of the tray in the direction in which the handle extends.

The pan has inside dimensions of about 4½" x 5½" at the top thereof and about 4½" x 4 15/16" at the lower edge of the side wall. The side wall has a vertical extent of about 5/8", and the bottom walls slope downwardly for about 1" in the vertical direction. The pan may advantageously be formed integrally of injection molded plastic.

Figure 4:
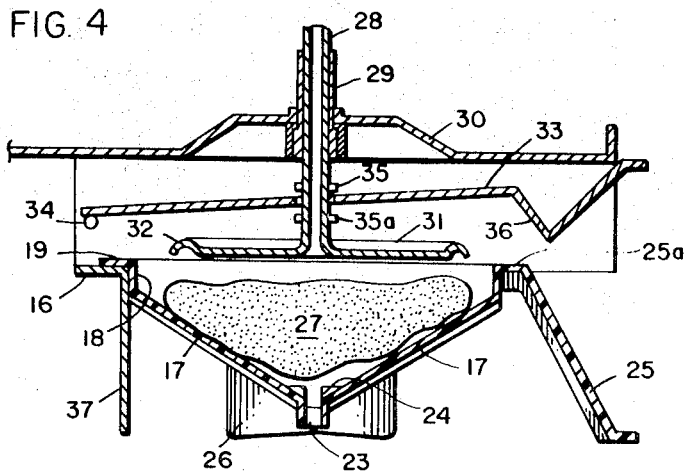
FIGS. 4–6 are fragmentary sectional views of the bag holding portion or brewer part of the apparatus of FIG. 1, but in different stages of operation.

A filter bag 27 filled with ground coffee is supported by the tray 14, and hot water for the brewing is supplied to the central top of the bag 27 by means of a conduit 28 (see particularly FIG. 4). The conduit is slidably supported within a vertically extending journal 29 provided as part of the housing 13, more particularly, the upwardly dished plate 30 which is connected to the side rails 16.

Figure 5:
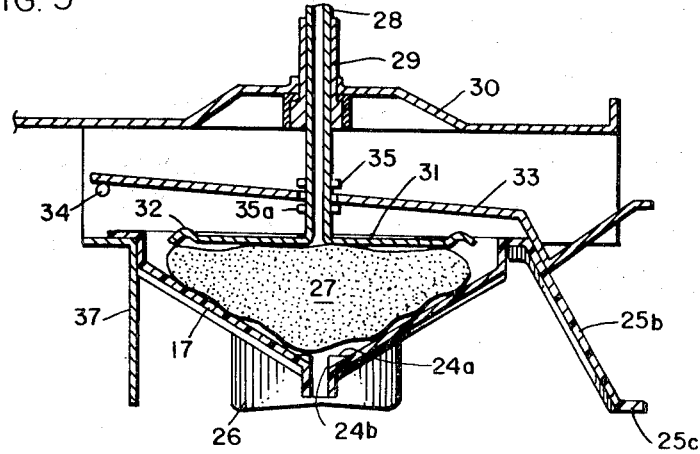

At its lower end, the pipe or conduit 28 carries a disclike presser plate 31, which, as can be seen in FIG. 5, rests on the bag 27 at the start of a brew cycle. As the brewing continues, the bag 27 expands to the condition designated 27' in FIG. 6, thereby elevating the presser plate 31. Thus, at all times during the brewing cycle, short circuiting of the water around the coffee grounds is prevented, a seal being effected annularly at the position generally designated 31' with the coffee grounds assuming the concave configuration illutrated in FIG. 6. Excellent results are obtained with a presser plate having a raised annular rib as at 32—see particularly FIG. 6.

The means for moving the presser plate 31 includes a first lever 33 which is pivotally supported as at 34 on the side frames 15. As can be apreciated best from FIG. 4, the lever 33 pivots in the openings 34 (in a clockwise motion) until the plate 31 engages the bag 27.

The conduit 28 is equipped with spaced washers 35 and 35a (see FIG. 4) which loosely confine the lever 33 and insure that the plate 31 moves with the lever 33 (compare FIGS. 4 and 5). The lever 33 is shaped to include a cam-like surface 36 which is adapted to engage the inclined portion 25b of the tray handle to drive the brew tray 16 rearward to a stop 37 in the event the tray 14 has not been inserted sufficiently. The appearance or association of lever 33 relative to the brew tray 14 is reassuring to the operator that the brew elements are arranged in proper position.

Operation

In FIG. 4, the apparatus is pictured as it would be organized when the tray 14 (with new bag 27) has just been inserted along the rails 16 provided as part of the chassis 13. The lever 33 is still in elevated position. Thereafter, the lever 33 is pivoted clockwise to the configuration seen in FIG. 5 wherein the plate 31 is caused to press down on the bag 27 and the camming surface 36 insures that the pan 16 is properly mounted in its rearmost position within the chassis 13.

Figure 6:
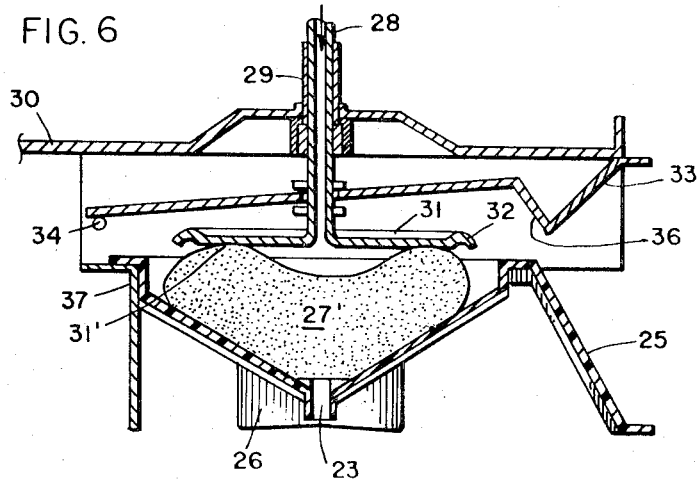

As water flows from the pipe 28, the coffee bag 27 is soon fully wetted, trapping some air. In addition, hot water on the grounds releases carbon dioxide. The result is an expanded bag that presses upward on the presser plate 31. This expansion is limited to the position shown in FIG. 6. The bag expanding against the plate 31 provides adequate sealing to force a substantial portion of the water into the bag 27 and through the coffee grounds. FIG. 6 illustrates a typical distribution of the grounds in the bag. This approximates the ideal uniform bed depth of grounds for uniform extraction.

After the water passes through the grounds, it is directed by the sloping bottom walls 17 toward the discharge opening 23. The portions of the bag in the corners of the tray are supported above the bottom of the channels 20, and fluid which has passed through the bag may therefore flow freely within the channels to the discharge opening. The central portion of the bag is supported away from the discharge opening and the channel bottoms by the embossments or wings 24. The thickness of the wings, of the order of about 1/16" is such that the wings do not interfere with the free flow of the water through the bag.

When the water flow stops, the freely moving presser plate 31 moves downwardly as the bag deflates. The weight of the presser plate 31 and the lever on the bag 27 aid the deflation, hence shortening the drip-out time, particularly as compared to a gravity system. After drip-out or when another brew is required, the lever 33 is raised and the pan 14 removed easily. Thus, there is no danger of ripping the bag of spent grounds with attendant messiness.

The expansion freedom that the bag experiences through the use of the presser plate 31 provides benefits which are not readily apparent. This arrangement is desirable when recognizing that the quality of bag construction and sealing is variable. Confining the bag too much, even through it assures a quick seal, leads to channeling, hence, weak over-extracted coffee. Too little confinement leads to the possibility of a very late seal and a weak brew or the possibility of the bag rupturing. The inventive arrangement provides a quick seal, sufficient expansion for excellent water distribution through the coffee grounds, yet reasonable confinement to prevent rupture. Should a coffee blend yield a slight or a very great amount of gas, the force exerted on the bag can easily be altered to allow the desired extraction response by applying a weight to the lever 33.

In the illustration given the lever 33 is used to press the presser plate 31 against the coffee bag However, the lever could be eliminated and a suitable weight could be mounted on the presser plate, the size of the weight being selected according to the amount and type of coffee being brewed. Whether or not a lever is used the combined weight pressing down upon the coffee bag is preferably about one pound. For example, if a lever is used, the downward force on the bag provided by the combined gravitational forces exerted by the lever, the presser plate, and any additional weight should be about one pound. If the lever is removed, additional weight could be added to the presser plate. The force exerted against the bag insures proper wetting of the coffee which in turn assures proper extraction.

The uninterrupted drip-out is additionally insured by the check expansion chamber 15 which is used on the discharge side of the water heat exchanger coil and upstream from the brew pan on the coffee brewer. When the brew cycle ends, the solenoid valve in the inlet line to the heat exchanger closes. The cooler water in the heat exchanger expands as it is heated—by virtue of included gases. As seen in FIG. 8, the expanded water exerts pressure on the plunger 38 and slightly lifts this plunger from its seat 39. This does not fully lift the plunger for this flow is able to pass through the small clearance of the body counterbore and the plunger stem as at 40. The amount of expanded water and its flow rate is very small and the water is easily accommodated by the chamber 15. This will occur only after the pressure of expansion has exceeded the check pressure established by the plunger weight on the orifice area. The approximate check pressure is 10 p.s.i. Should a chamber not be used, the quantity of water force from the exchanger is much greater because entrained air and/or gases in the water expand considerably. The check feature prevents this excess expansion. Tests without the chamber prove that the next brew can be somewhat short by the expanded quantity lost by dripping.

When the brew is initiated, the water flow rate is great enough to lift the plunger sufficiently for it to seal the top port 41 (see FIG. 8)—thereby preventing further outflow of air and water. The pressure in the heat exchanger is always greater than the pressure in the chamber, hence, entrained gases expand as water enters the chamber and thus limits the water content of the chamber throughout the brew cycle. When the brew cycle ends, the plunger 38 drops onto its seat 39 and opens the port 41 (as in FIG. 7) permitting water in the line from the chamber to the grounds to drain completely by siphon action onto the grounds and this, eliminating any after-dripping when the brew pan is removed from the machine.

A coffee brewer especially suitable for office use, includes a through type as seen in FIGS. 9 and 10. There I provide a tank 118 having a positive flow cut-off feature for ending the brew. This is desirable to assure a definite brew period. In FIGS. 9 and 10, a float device is illustrated that performs this purpose. Referring now to FIG. 10, the operation of the apparatus seen therein starts with a pre-measured amount of water being discharged into the bottom of the tank 118. This comes from a pour-in container 142 and by inter-connecting piping 143. The introduction of the water into the bottom of the tank 118 is at a much greater rate than its discharge rate (brew rate) until the level in the tank equals that in the pour-in container. The level of water in the tank rises until the water level rises over the top of the cup 144. The cup 144 completely floods and sinks to its lower position (see FIG. 9) wherein the stop 147 on stem 145 engages the upper portion of stop 146. Thereupon the brewing starts as water flows through the cup and through the flexible tube 148 connecting the cup to the tank outlet and ultimately to the pipe 127.

As brewing proceeds, the water level sinks to the top rim of the cup 144. At this level the water flow from the cup exceeds the water dribble into the cup and it quickly approaches a buoyant state. As the cup 144 empties, ending the brew, the cup floats upward to its upper stop. The top rim of the cup is well above the water level assuring the flow cutoff feature. The rim-to-water level differential obtained by this arrangement accommodates any water expansion that may occur resulting from heating the cooler water in the bottom of the tank as by heater 121. This arrangement provides the additional feature that it will not air lock or partially air choke as compared to a simple siphon.

When desired, brew time control is achieved by a manual valve 149 in the flexible tubing 150 interconnecting the cup 144 with the pipe 127. This control is advantageous when bags of different weight or grind of coffee are used.

An important feature of this type of pressure system concerns the percent change of pressure head—that this be held as small as practical for a given cabinet height—that the average pressure head be approximately 12" for accepted brew time standards.

While in the foregoing specification a detailed description of the invention has been set down for the purpose of illustration, many variations of the details herein given may be made by those skilled in the art without departing from the spirit and scope of the invention.

I claim:

1. In coffee brewing apparatus wherein heated water is passed through ground coffee confined in a filtering bag supported on a tray, the tray including downwardly converging bottom walls and having a channel formed at the intersection of each of the converging bottom walls, the bottom of each channel being spaced downwardly from the associated bottom walls, the channels extending toward a discharge opening in the pan, the apparatus being equipped with rail means for removably supporting the tray, and a plate mountd on the rail means for movement toward and away from the tray whereby the plate is adapted to be moved into engagement with the top of the bag, the plate having a central discharge outlet for said heated water whereby when said heated water is discharged out of said bag, the swelling of said bag effects a seal with the plate generally annularly relative to said outlet to direct further water into the bag.

2. The apparatus of claim 1 in which the tray includes a flange extending outwardly from the upper portion thereof for supporting the tray on the rail means.

3. The apparatus of claim 1 including lever means on the coffe brewing apparatus adapted to simultaneously bear against the end to urge the tray into position below the plate.

4. The apparatus of claim 3 in which said tray includes a handle having a portion extending downwardly and away from the tray, said lever means including an elongated member pivotally mounted on the rail means, said lever member being contoured to provide a cam surface for engaging the handle to urge the tray into position.

5. The apparatus of claim 1 in which water source means, said water source means including a check expansion chamber equipped with a liftable plunger arranged for coaction with a water flow orifice, said plunger, in its elevated position, being arranged and sized to close a gas egress port in said chamber.

6. The apparatus of claim 1 in which water source means are operably associated with said apparatus, said water source means including a tank slidably supporting a floating cup, said cup being equipped with a generally vertically disposed stem having limited vertical movement, conduit means coupling said cup to said plate whereby downward movement of said cup achieves substantially drip-free cutoff of water flow.

7. The apparatus of claim 1 in which the plate exerts a downward force against the bag of about one pound.

References Cited

UNITED STATES PATENTS

| | | | |
|---|---|---|---|
| 3,086,447 | 4/1963 | Arnett | 99—295 |
| 3,320,073 | 5/1967 | Bixby | 99—295 |
| 3,384,004 | 5/1968 | Perlman | 99—289 |
| 3,450,024 | 6/1969 | Martin | 99—295 |
| 3,502,017 | 3/1970 | Alexander | 99—295 |

ROBERT W. JENKINS, Primary Examiner

U.S. Cl. X.R.

99—307